United States Patent [19]
Fisher et al.

[11] 3,953,111
[45] Apr. 27, 1976

[54] NON-LINEAR LENS

[75] Inventors: Ralph W. Fisher, St. Charles; George Licis, Manchester; Wayne W. Schurter, Bridgeton, all of Mo.

[73] Assignee: McDonnell Douglas Corporation, St. Louis, Mo.

[22] Filed: Nov. 4, 1974

[21] Appl. No.: 520,487

[52] U.S. Cl. ............................... 350/189; 350/181
[51] Int. Cl.² .................. B29D 13/18; G02B 13/08
[58] Field of Search ........... 350/189, 192, 198, 175, 350/181

[56] References Cited
UNITED STATES PATENTS

3,037,426 6/1962 Hughues .......................... 350/192

FOREIGN PATENTS OR APPLICATIONS

1,105,632 4/1961 Germany ........................ 350/175 R

OTHER PUBLICATIONS

Rigler; A. K. and Vogt; T. P., "Spline Functions: an Alternative Representation of Aspheric Surfaces," Applied Optics, Vol. 10, No. 7, pp. 1648–1651, July, 1971.

*Primary Examiner*—John K. Corbin
*Assistant Examiner*—Conrad Clark
*Attorney, Agent, or Firm*—Graveley, Lieder & Woodruff

[57] ABSTRACT

A non-linear lens possesses distortion characteristics which are such that objects along the optical axis of the lens occupy disproportionately large areas of the image cast by the lens, whereas objects near the periphery of the field of view occupy a disproportionately small area of the image. The distortion characteristics approximate the formula $H = \sin^{1/3} \theta$ where H is height measured from the optical axis and $\theta$ is the angle measured from the optical axis. The image cast by the lens falls on the vidicon of a television camera where it is scanned and transmitted to a projector. Since the lens enlarges objects in the vicinity of the optical axis, those objects are transmitted with much greater detail than objects in the peripheral region of the view. The transmitted image is reproduced at a projector and the reproduced image is rectified through another lens having identical distortion characteristics. This lens casts the rectified image on a spherical screen. The final image which appears on the screen possesses a high degree of acuity in the region of the optical axis and substantially less acuity in peripheral regions. The resolution throughout the entire field of the reproduced image corresponds quite closely to the resolution characteristics of the human eye.

10 Claims, 7 Drawing Figures

FIG. 6

| ANGLE | IMAGE LENGTH |
|---|---|
| 0 | 0 |
| 0.9 | 0.1 |
| 2.6 | 0.2 |
| 5.1 | 0.3 |
| 8.3 | 0.4 |
| 12.2 | 0.5 |
| 16.8 | 0.6 |
| 23.5 | 0.7 |
| 34.3 | 0.8 |
| 52.4 | 0.9 |
| 90.0 | 1.0 |

NON-LINEAR LENS

The Government has rights in this invention pursuant to Contract Number N00014-73-C-0154 awarded by the Department of the Navy.

BACKGROUND OF THE INVENTION

The present invention relates in general to lenses and more particularly to a lens having non-linear distortion characteristics.

The typical remote viewing system utilizes a television camera at the remote location, some type of projector at the observer location, and a television transmitting system linking the two. These viewing systems fall far short of duplicating the visual characteristis of the human eye in that they have extremely limited fields of view or else poor resolution in a large field of view.

In particular, for any fixed angular resolution (measured in minutes of arc) and frame rate (usually 30 Hz or frames/sec.) a definite relationship exists between field of view and bandwidth for transmitting that field of view. For example, commercial television, which utilizes a 525 line raster traced 30 times per second, operates on a bandwidth of 3.93 MHz. To match the resolution of the human eye, which is one minute of arc along its foveal or optical axis, the field of view for commercial television must be restricted to less than 10° (see FIG. 1). On the other hand, if the field of view is increased to about 180°, which is the field of view for the human eye, the bandwidth must be increased to 1000 Mhz to maintain one minute of arc resolution over the entire field. This demands a raster of 10,000 lines and is far in excess of the capabilities of current television systems.

Indeed, the most advanced television currently available utilizes an 875 line system and requires a bandwidth of 10.9 Mhz. This provides a field of view of about 20° with one minute arc resolution throughout the entire field, which is far less than the 180° field of view possessed by the human eye.

From the foregoing, it is clear that present television viewing systems present a dilemma. If the field of view is sufficient to encompass all possible locations of interest, resolution is so low that detection or clear observation is impossible. On the other hand, if the resolution is adequate to insure that the objects will be seen clearly, the field of view is quite limited and many objects of interest are located outside of the field of view.

In a sense the human eye provides a solution for the foregoing dilemma. The human eye possesses high optical acuity along and in the vicinity of its foveal or optical axis, but the acuity diminishes outwardly therefrom. In other words, the eye distinguishes fine detail directly in front of it, but not to the sides. This characteristic is not derived from the shape of the eye lens, but instead results from the fact that most of the optical fibers for the eye are concentrated in the vicinity of the optical axis. Hence, only along the optical axis does the eye possess one minute of arc resolution. The resolution becomes progressively less toward the periphery of the field of vision (see FIG. 2). Nevertheless, the resolution in the peripheral area is sufficient to detect the presence of many objects in that area as well as much movement in that area. Of course, when the eye detects anything of interest in the peripheral areas, the head or eye is immediately moved to bring the foveal axis to the thing of interest and thereby provide a clearer image of it.

SUMMARY OF THE INVENTION

One of the principal objects of the present invention is to provide a lens having non-linear distortion characteristics which are such that objects located along and near the optical axis of the lens occupy a disproportionately large area of the image produced by the lens. Another object is to provide a lens of the type stated which closely approximates the resolution characteristics of the human eye over a wide field of view. A further object is to provide a lens of the type stated which is ideally suited for use in remote viewing systems in that it provides a wide field of view with maximum acuity along the optical axis. These and other objects and advantages will become apparent hereinafter.

The present invention is embodied in a lens which distorts a field of view such that objects in the vicinity of the optical axis occupy a disproportionately large area of the image cast by the lens and objects in the peripheral region of the field of view occupy a disproportionately small area of the image. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

DETAILED DESCRIPTION

Figure 3:
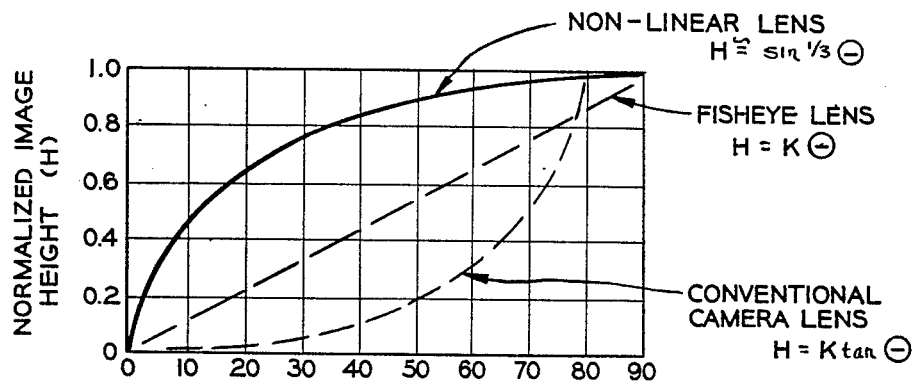
FIG. 3 is a graph showing the distortion characteristics of the lens of the present invention in terms of normalized image height and field of view and comparing such distortion characteristics with the distortion characteristics of a fisheye lens and a conventional camera lens.
Figure 6:
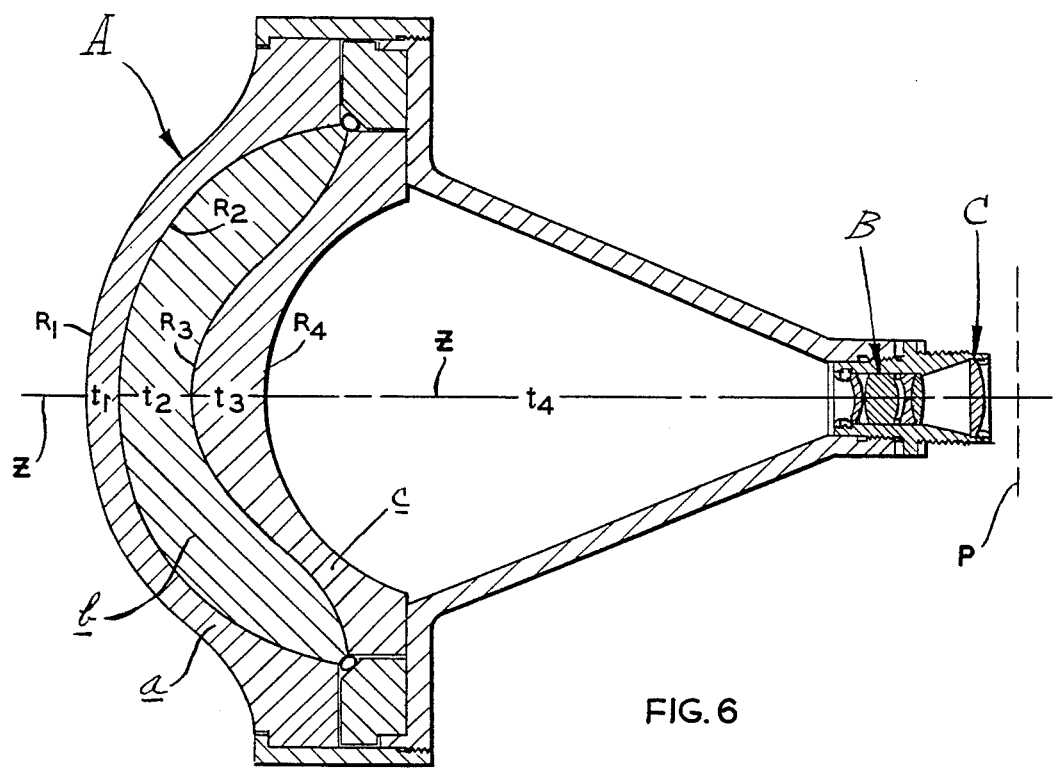
FIG. 6 is a sectional view of the non-linear lens.
Figure 7:
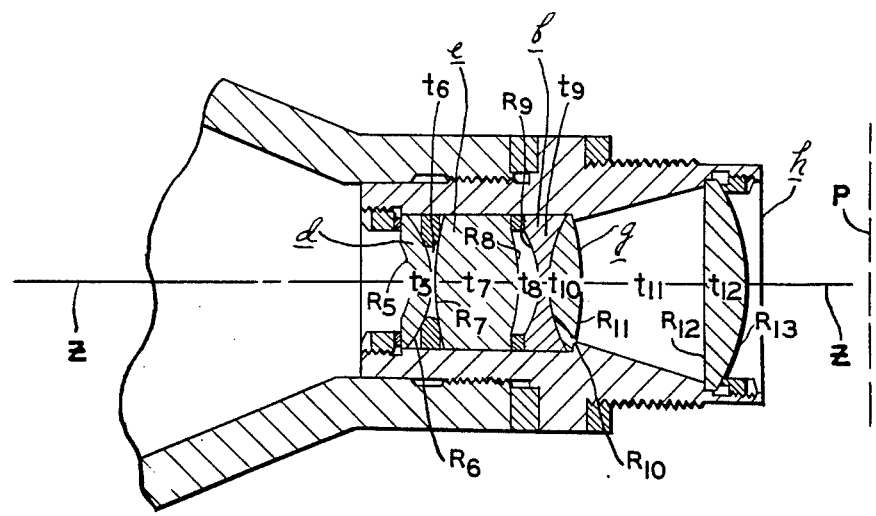
FIG. 7 is an enlarged sectional view of the second and third lens groupings for the non-linear lens.

The lens of the present invention (FIGS. 6 and 7) provides non-linear image distortion characteristics over an extremely wide field of view which approaches 160°. This is in contrast to so-called fisheye lenses which provide linear distortion characteristics. In paticular, with a linear or fisheye lens the image height is directly proportional to the field angle (FIG. 3). The relationship is defined by the formula $H = K\theta$ where $H$ is the image height from the optical axis, $K$ is a constant, and $\theta$ is the angle measured from the optical axis. Thus, with a linear lens an object occupying twice the angle as another object, when measured from the optical axis, will cast an image twice as high as the other object. On the other hand, with a non-linear lens of the present invention the image height is equal to a variable function of the field angle (FIG. 3). The relationship is approximated by the formula $H = \sin^{1/3} \theta$. Thus, objects centered along the optical axis of the non-linear lens L cast a much larger image than objects located near the periphery of the field of view with the size diminishing as the angle from the optical axis increases. The result of the distortion is that objects along the optical axis occupy a disproportionately large share of the image cast by the lens when compared with other objects closer to the periphery of the field of view for the lens. In effect, the center of the non-linear lens is a telephoto lens, while the periphery of the lens amounts to a wide angle lens with the annular region between the center and periphery varying from telephoto to wide angle. Naturally, the image produced is quite distorted. The typical camera lens is represented by the formula $H = K \tan \theta$ (FIG. 3) and is non-linear, but in a sense opposite from that of the lens of the present invention.

Figure 4:
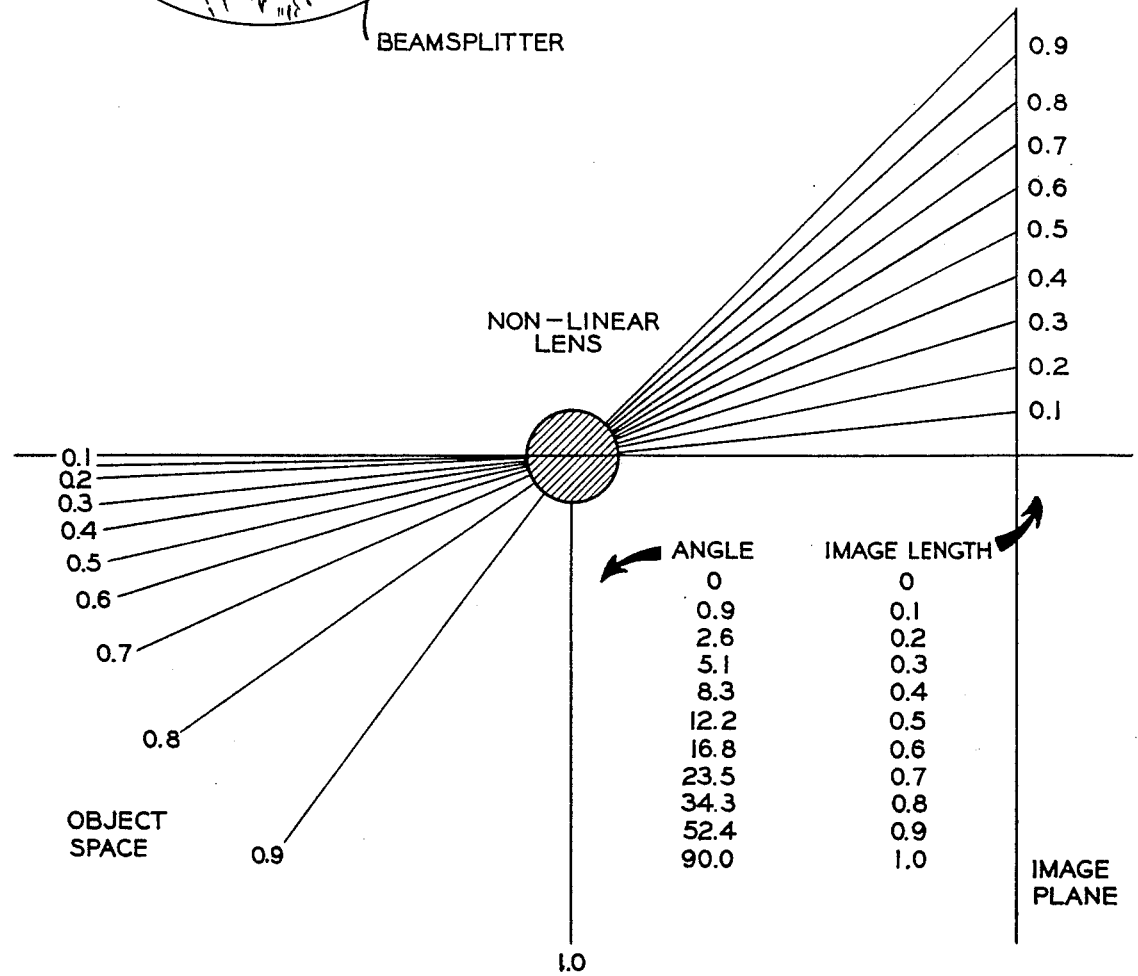
FIG. 4 is a graphic representation of the non-linear distortion characteristics and showing how equal increments on the image plane correspond to unequal increments in the field of view.

The non-linear transfer characteristics of the lens may be illustrated by breaking the image into equal angular increments (FIG. 4) and comparing each image increment with the corresponding increment it represents in the actual field of view. Clearly, equal angular increments on the image side of the lens represent unequal increments on the object side of the lens. More specifically, near the optical axis relatively small arcs on the object side are converted to large arcs on the image side, thus enlarging the image. At about 25° from the optical axis arcs on the object side equal the arcs on the image side and this portion of the lens may be considered linear. Objects from about 25° to 80° (lens periphery) occupy arcs much larger than they cast on the image side with the variance in arcs becoming greater as the object approaches the periphery of the field. Hence, objects within 25° of the optical axis for the lens are magnified with the magnification being substantial along the lens axis, whereas objects in the annular region located beyond 25° are reduced in size, with the reduction becoming progressively greater as the maximum field angle for the lens is approached.

Figure 5:
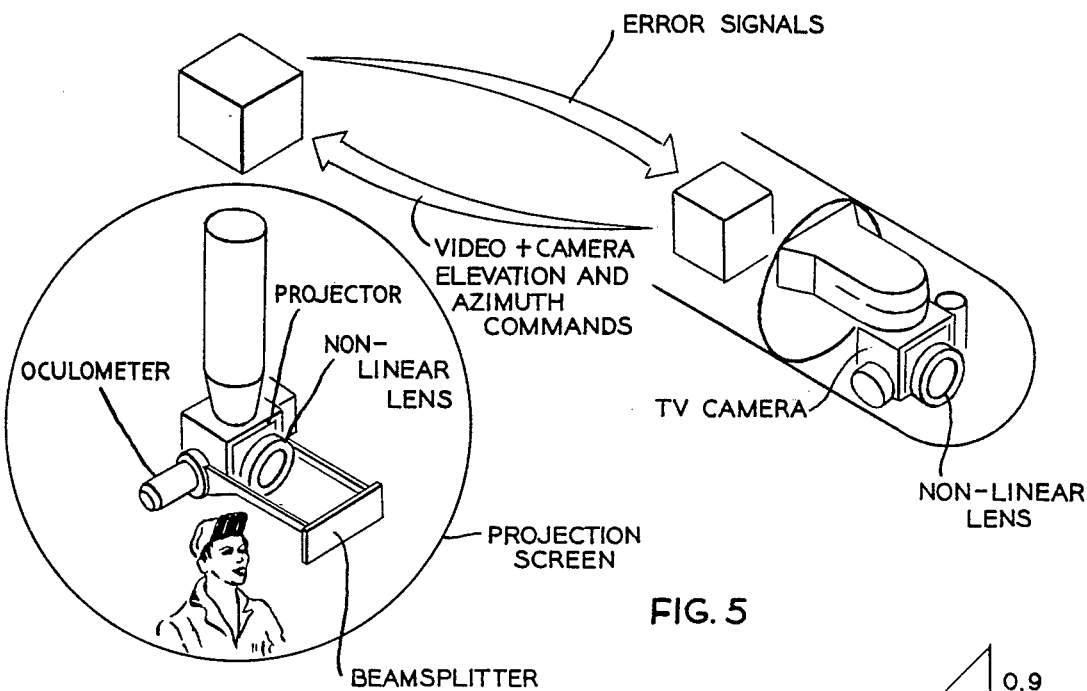
FIG. 5 is a schematic perspective view of the remote viewing system in which the non-linear lens may be utilized.

To appreciate the lens requires an understanding of the remote viewing system in which it is utilized. That viewing system basically comprises (FIG. 5) a television camera at the remote location, a projector at the observer location, and a transmission system linking the camera and projector in both directions. Both the camera and projector are fitted with non-linear lenses having identical distortion characteristics. However, the projector lens is mounted just the reverse of the camera lens so that it rectifies the distortion created by the camera lens. The camera is supported on a gimballed mount and is therefore capable of swinging both vertical and horizontal angles with respect to fixed coordinates at the remote location. A suitable servo mechanism bridges the gimballed mount to control the position of the camera. The projector is likewise supported on a gimballed mount which permits it to swing both vertical and horizontal angles with respect to fixed coordinates at the observer location. Another servo mechanism bridges the gimballed mount of the projector, and this servo is slaved to the camera through the transmission system such that a change in elevation or azimuth of the camera with respect to its fixed coordinates results in a corresponding change in elevation and azimuth of the projector with respect to its fixed coordinates.

The projector projects the transmitted image through its non-linear lens which casts the image upon a spherical screen surrounding the projector. The observer views the screen from the position of the projector.

Positioned on the projector is an oculometer which views the observer's eye through a transparent beamsplitter, and in effect tracks the observer's eye, producing error signals whenever the foveal axis of the eye deviates from the optical axis of the projector lens. In other words, error signals are produced when the foveal axis of the eye and the optical axis of the projector lens intersect the screen at different locations. These signals are converted into elevation and azimuth commands which are transmitted to the servo system for the camera through the transmission system. The commands cause the camera to change elevation and azimuth, and the movement is such that the corresponding movement of the projector reduces the error and brings the foveal axis of the camera back toward coincidence with the optical axis of the lens, at least at the screen. Thus, the oculometer controls the position of the camera and the camera controls the position of the projector, so in effect the camera and projector are both slaved to the observer's eye through the oculometer. The oculometer and servo mechanisms for the camera and projector should all respond fast enough to bring the optical axis of the projector lens into coincidence with, or at least within 2 percent of, the foveal axis for the eye within 0.2 seconds. This is about as rapidly as the eye can fixate and perceive when changing from one object of interest to another, so the lag in the projector is barely discernible, if at all. A suitable oculometer is marketed by Honeywell Inc., Radiation Center, Boston, Mass.

Figure 1:
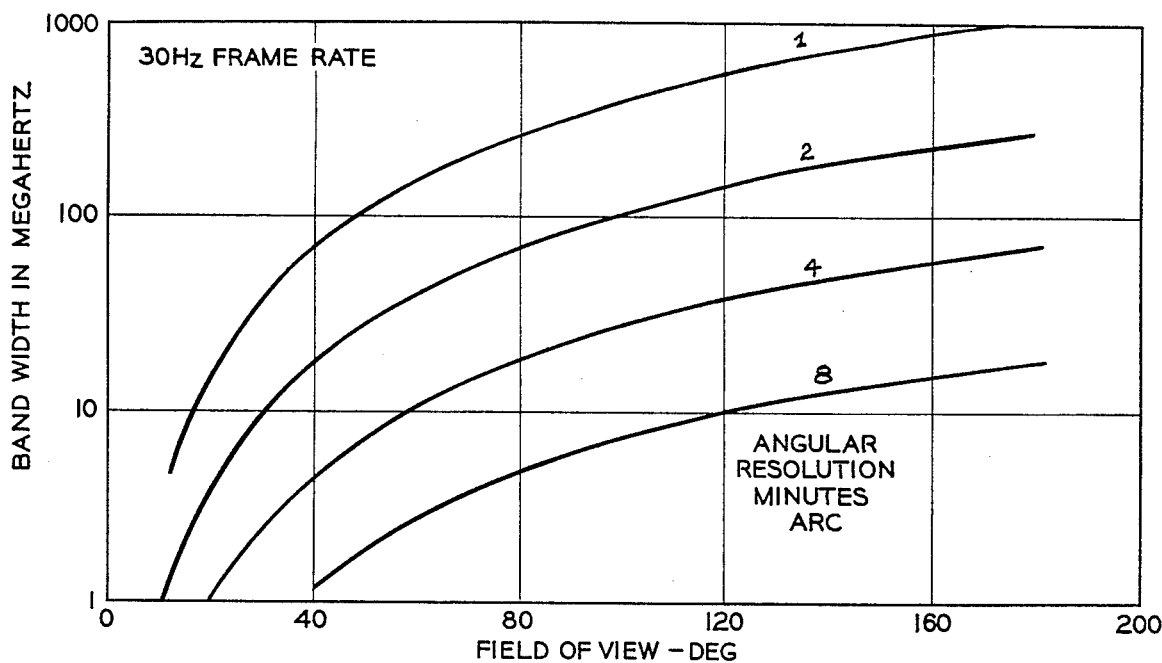
FIG. 1 is a graph showing the relationship between field of view, angular resolution, and bandwidth for transmitting a picture of a remote location by television.

Referring again to the television camera at the remote location, the camera lens casts the distorted image of all objects in the field of view on the vidicon of the camera, and this vidicon is scanned in the usual manner, that is with a beam which traces a raster pattern at uniform velocity. The conventional commercial television system of 525 lines per scan and 30 scans per second may be employed. This requires a bandwidth of 3.93 MHz (FIG. 1). The beam in effect picks the image off of the camera vidicon. Since the objects along the optical axis are magnified and occupy a disproportionately large area of the vidicon, they are picked off the vidicon in great detail. On the other hand, objects in the peripheral region of the field of view are reduced in size and occupy relatively little area on the vidicon. Hence, they are picked off of the vidicon with substantially less detail. The picture is transmitted accordingly. The magnification along and near the optical axis is great enough to enable the beam to extract one minute of arc detail, which is all an eye with 20—20 vision can perceive along its foveal axis. The beam extracts greater angles of arc detail away from the optical axis and hence poorer resolution is available in this area. In this regard, it will be recalled that to extract one minute arc detail over a full 180° requires a 10,000 line vidicon or in other words a bandwidth of 1000 MHz which is far in excess of present television capabilities.

The distorted image cast upon the vidicon of the camera is reproduced by the light valve of the projector and this image likewise has at least one minute of arc resolution along the optical axis with the resolution diminishing toward the periphery of the image so that only much larger angles of arc are discernible beyond the optical axis. The image so produced is rectified by the projector lens which casts it upon the spherical screen. The resulting screen image constitutes a faithful reproduction of the scene which lies within the field of view for the camera lens. The projector lens in no way affects the resolution of the image it transmits and as a result the image appearing on the screen shows detail as close as one minute of arc at the optical axis for the lens and the area immediately surrounding it, but in the remaining area such detail is not available. In other words, the resolution in the other areas is somewhat less. Hence, the projected image is very sharp and clear on the screen at the optical axis, that is directly in front of the projector, and then turns somewhat fuzzy or blurred in the surrounding area particularly at the maximum angle of 80° from the optical axis.

Figure 2:
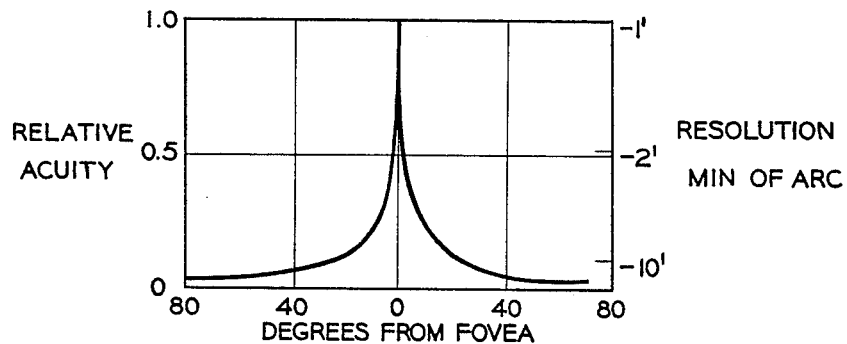
FIG. 2 is a graph showing relative acuity of the human eye throughout the field of view for the eye.

The variance in clarity or in resolution of the final image cast upon the screen closely resembles the optical characteristics of the eye (FIG. 2). In this connection, it will be recalled that most of the optical sensing elements for the human eye are concentrated along the foveal axis.

As previously mentioned, the oculometer tracks the eye position and causes the camera to change position in response to eye movement while the projector undergoes corresponding movement as a result of being slaved to the camera. Consequently, the foveal or optical axis of the eye is always directed at the center of the projected image, that is the portion along the optical axis for the projector lens. This is the portion having the one minute of arc resolution. Since the resolution of the eye falls off with the angle from the foveal axis, little is lost by having the resolution of the projected image diminish with the angle from the optical axis. The resolution in the surrounding area of the picture is still good enough to permit the eye, as a result of the built-in peripheral vision, to detect movement and objects of interest, and if whatever is detected appears interesting enough, the viewer will turn his eye toward it. This, of course, causes the camera and projector to change position so that the formerly blurred area of the image to which the eye is turned lies along the optical axis of the camera and projector lenses and is projected with high resolution.

The non-linear lens (FIGS. 6 and 7) has three lens sets or groupings A, B and C. Its aperture ratio is 5.6 and it forms a 0.358 F diameter image where F is the focal length along the optical axis Z. The first lens grouping A is considerably larger than the other grouping B and C and is contained in the large end of a tapered lens housing. The other lens groupings B and C are contained within a subhousing which fits into the small end of the tapered main housing. The first lens grouping is a triplet and provides the mapping function, that is the unique distortion which is essentially defined by the formula $H = \sin^{1/3} \theta$. The second grouping B, which has four elements, contains the aperture stop and forms an image of the scene as distorted by the first grouping A. The third grouping C is a single element which functions as a field flatener, that is it makes the image cast by the second grouping B planar.

The first lens grouping A (FIG. 6) consists of three lens elements $a$, $b$, and $c$ with no air gaps between adjacent elements. The outside lens element $a$ has a non-spherical surface $R_1$ exposed outwardly and a spherical surface $R_2$ presented inwardly against a matching surface $R_2$ on the intermediate element $b$. The opposite surface $R_3$ of the intermediate element $b$ is non-spherical and abuts a matching surface $R_3$ on the inside element $c$. The inside element $c$ also has a spherical surface $R_4$ which faces the tapered interior of the housing 2 and is presented toward the second lens grouping B. Along the optical axis Z for the lens, the element $a$ has a thickness $t_1$, the element $b$ a thickness $t_2$, and the element $c$ a thickness $t_3$. Index matching oil couples the matching surfaces $R_2$ of the lens elements $a$ and $b$ and the matching surfaces $R_3$ of the lens elements $b$ and $c$. The outside and inside lens elements $a$ and $c$ are formed from type SK16 glass, whereas the intermediate lens element is formed from type F2 glass. The index of refraction for SK16 glass is 1.62041 and for F2 glass is 1.62004. The Abbe number for SK16 is 60.27 and for F2 is 36.25.

Turning now to the second lens grouping B, it consists of four lens elements, namely, a convex-concave lens element $d$, a double convex lens element $e$, a double concave lens element $f$, and a double convex lens element $g$, all arranged in that order from the first lens grouping A. The innermost lens element $d$ has spherical surfaces $R_5$ and $R_6$ and a thickness $t_5$, along the optical axis Z. The next lens element $e$ has spherical surfaces $R_7$ and $R_8$ and a thickness $t_7$ along the optical axis Z. Next, is the double concave lens element $f$ having spherical surfaces $R_9$ and $R_{10}$ and a thickness $t_{10}$ along the optical axis Z. The surface $R_{10}$ of the element $f$ corresponds to and is against a matching surface $R_{10}$ on the lens element $g$ which has another spherical surface $R_{11}$ presented toward the third lens grouping C. The surfaces $R_6$ and $R_7$ of the lens elements $d$ and $e$, respectively, are separated by an air gap $t_6$ measured along the axis Z of the lens, while the surfaces $R_6$ and $R_9$ of the lens elements $e$ and $f$, respectively, are separated by an air gap $t_8$ measured along the optical axis Z. The matching surfaces $R_{10}$ of the lens element $f$ and $g$ are cemented. The lens elements $d$ and $f$ are formed from type F2 glass, while the lens elements $e$ and $g$ are formed from type SK16 glass.

The third lens grouping C contains a single lens element $h$ having a non-spherical and non-planar surface $R_{12}$ which is presented toward the second lens group B and a spherical surface $R_{13}$ exposed outwardly. The lens element $h$ has a thickness $t_{12}$ along the optical axis Z and is made from the type SK16 glass.

The first and second lens groupings A and B are separated by an air gap $t_4$ which is measured from the surface $R_4$ to the surface $R_5$ along the axis Z of the lens. The second and third lens groupings B and C are separated by an air gap $t_{11}$ which is the distance between the surfaces $R_{11}$ and $R_{12}$ measured along the optical axis Z.

The distorted image formed by the non-linear lens exists in an image plane $p$ located beyond the third lens grouping C. The vidicon of the television camera should be at this plane $p$.

The surfaces $R_2$, $R_4$, $R_5$, $R_6$, $R_7$, $R_8$, $R_9$, $R_{10}$, $R_{11}$ and $R_{13}$ are all spherical and have their centers of curvature along the optical axis Z of the lens. The surfaces $R_1$, $R_3$, and $R_{12}$, while being curved, are not spherical. The radii of curvature for the surfaces $R_1$ through $R_{13}$ follow:

|  |  | $R_1$ | : 1.37F | (at optical axis only) |
|---|---|---|---|---|
| 1.4F | < | $R_2$ | < 1.5 F | |
|  |  | $R_3$ | : 0.729F | (at optical axis only) |
| 1.091F | < | $R_4$ | < 1.092F | |
| 0.2373F | <− | $R_5$ | < 0.2376F | |
| 0.272F | <− | $R_6$ | < 0.273F | |
| 0.3936F | < | $R_7$ | < 0.3940F | |
| 0.334F | <− | $R_8$ | < 0.335F | |
| 0.2268F | <− | $R_9$ | < 0.2271F | |

-continued 0.280F < $R_{10}$ < 0.285F
0.571F <−$R_{11}$ < 0.572F
       −$R_{12}$ : 0.314F  (at optical axis only)
0.4168F <−$R_{13}$ < 0.4173F where F is the focal length of the lens along its optical axis Z. Note, that since the surfaces $R_1$, $R_3$ and $R_{13}$ are not spherical, the radii of curvature listed above for those surfaces represents only radii along the optical axis Z of the lens.

The thicknesses of the various lens elements measured along the optical axis Z follow:

0.199F < $t_1$ < 0.202F
0.399F < $t_2$ < 0.402F
0.399F < $t_3$ < 0.402F
0.047F < $t_5$ < 0.049F
0.186F < $t_7$ < 0.189F
0.019F < $t_9$ < 0.022F
0.06F < $t_{10}$ < 0.07F
0.08F < $t_{12}$ < 0.09F

The thicknesses of the air gaps measured along the optical axis Z follow:

3.248F < $t_4$ < 3.251F
0.0004F < $t_6$ < 0.0014F
0.266F < $t_{11}$ < 0.267F
0.037F < $t_8$ < 0.041F

As previously noted, the surfaces $R_1$, $R_3$, and $R_{13}$ are neither spherical nor planar. Furthermore, not one of them fits any single known mathematical formula. They are defined in terms of splines, that is each surface is broken up into increments or intervals which are defined separately. The surfaces $R_1$, $R_3$ and $R_{13}$ are considered spline surfaces and are defined by the following cubic spline equation:

$$S(\rho) = M_{i-1} \frac{(\rho_i - \rho)^3}{6 h_i} + M_i \frac{(\rho - \rho_{i-1})^3}{6 h_i} + \left(X_{i-1} - \frac{M_{i-1} h_i^2}{6}\right) \frac{(\rho_i - \rho)}{h_i} + \left(X_i - \frac{M_i h_i^2}{6}\right)(\rho - \rho_{i-1})$$

where $\rho_{i-1}$ = The value of the spline surface height at the start of the ith interval.
$\rho_i$ = The value of the spline surface height at the end of the ith interval.
$X_{i-1}$ = The value of the spline surface sag at the start of the ith interval.
$X_i$ = The value of the spline surface sag at the end of the ith interval.
$h_i = \rho_i - \rho_{i-1}$ = The length of the ith interval.
$M_{i-1}$ = The value of the slope derivative at the start of the ith interval.
$M_i$ = The value of the slope derivative at the end of the ith interval.
$\rho$ = The spline surface height (independent variable)
$S(\rho)$ = The spline surface sag as a function of height (dependent variable)

The slope of a spline surface element at a particular height ($\rho$) is given by Slope = d $S(\rho)/d\rho$ The values of spline surface sag (X), spline surface height ($\rho$), and slope derivative (M) for various spline intervals 0, 1, 2, etc. follow:

| | Surface $R_1$ | Surface $R_3$ | Surface $R_{13}$ |
|---|---|---|---|
| X(0) | 0.0000000 | 0.0000000 | 0.0000000 |
| X(1) | 0.2108668 | 0.1795877 | −0.0029324 |
| X(2) | 0.8554116 | 0.7202623 | −0.0041130 |
| X(3) | 1.7838662 | 1.4361922 | −0.0004761 |
| X(4) | 1.9775600 | 1.6027882 | 0.0065340 |
| X(5) | — | — | 0.0100000 |
| X(6) | — | — | 0.0100000 |
| $\rho$(0) | 0.0000000 | 0.0000000 | 0.0000000 |
| $\rho$(1) | 1.0780200 | 0.7222734 | 0.0825000 |
| $\rho$(2) | 2.1560400 | 1.4444546 | 0.1650000 |
| $\rho$(3) | 3.2340801 | 2.1668202 | 0.2475000 |
| $\rho$(4) | 3.6360801 | 2.4760010 | 0.3300000 |
| $\rho$(5) | — | — | 0.4010000 |
| $\rho$(6) | — | — | 0.5000000 |
| M(0) | 0.3644990 | 0.6859612 | −1.5916510 |
| M(1) | 0.3596961 | 0.6935749 | 0.5983017 |
| M(2) | 0.4358774 | 0.6937277 | 0.7436587 |
| M(3) | −0.6375478 | −1.4543979 | 0.6856855 |
| M(4) | −2.1376087 | −0.6921574 | −0.5200549 |
| M(5) | — | — | 0.0000000 |
| M(6) | — | — | 0.0000000 |

What is claimed is:

1. A non-linear lens comprising first lens means for distorting a scene in the field of view for the lens such that objects in the vicinity of the optical axis are given substantially greater prominence than objects in the peripheral region of the field of view, and second lens means for forming a real image of the scene as distorted by the first lens means, whereby objects in the vicinity of the optical axis will occupy a disproportionately large area of the real image and objects in peripheral regions of the scene will occupy a disproportionately small area of the real image.

2. A lens according to claim 1 wherein the field of view is at least approximately 160°.

3. A non-linear lens according to claim 1 and further characterized by third lens means for causing the real image formed by the second lens means to lie in a plane.

4. A non-linear lens according to claim 1 wherein the distortion in the real image approximates the formula $$H = \sin^{1/3} \theta$$

where H is the distance in the image measured from the optical axis and $\theta$ is the angle measured from the optical axis.

5. A non-linear lens according to claim 1 wherein the first lens means comprises a plurality of individual lens elements and the second lens means includes a plurality of different lens elements.

6. A non-linear lens comprising a first lens grouping for distorting a scene in the field of view for the lens such that objects in the vicinity of the optical axis are given greater prominence than objects in the peripheral region of the field of view, the first lens grouping including first, second, and third lens elements, the first lens element having surfaces $R_1$ and $R_2$, the second lens element having surfaces $R_2$ and $R_3$, and the third lens element having surfaces $R_3$ and $R_4$, the surface $R_2$ of the first lens element matching the surface $R_2$ of the second lens element and being substantially in contact therewith, the surface $R_3$ of the second lens element matching the surface $R_3$ of the third lens element and being substantially in contact therewith, the surfaces $R_1$ and $R_3$ being curved at the optical axis and being non-spherical beyond the optical axis, the surfaces $R_2$ and $R_4$ being spherical substantially throughout, the radii of the surfaces along the optical axis being substantially as follows:

|  | $R_1$: |  | 1.37 | F |
|---|---|---|---|---|
| 1.4F | <$R_2$ | < | 1.5 | F |
|  | $R_3$: |  | 0.729 | F |
| 1.091F | <$R_4$ | < | 1.092 | F | where F is the focal length of the lens along the optical axis of the lens; and a second lens grouping for forming a real image of the scene as distorted by the first grouping, whereby objects in the vicinity of the optical axis will occupy a disproportionately large area of the real image and objects in peripheral regions of the scene will occupy a disproportionately small area of the real image.

7. A lens according to claim 6 wherein the first, second, and third lens elements have thicknesses $t_1$, $t_2$ and $t_3$, respectively, along the optical axis of the lens and the thicknesses are as follows:
$0.199F < t_1 < 0.202F$
$0.399F < t_2 < 0.402F$
$0.399F < t_3 < 0.402F$.

8. A non-linear lens according to claim 6 wherein the non-spherical surfaces $R_1$ and $R_3$ are defined by the cubic spline equation $$S(\rho) = M_{i-1} \frac{(\rho_i - \rho)^3}{6 h_i} + M_i \frac{(\rho - \rho_{i-1})^3}{6 h_i} + \left(X_{i-1} - \frac{M_{i-1} h_i^2}{6}\right) \frac{(\rho_i - \rho)}{h_i} + \left(X_i - \frac{M_i h_i^2}{6}\right)(\rho - \rho_{i-1})$$

where
- i-1 = The value of the spline surface height at the start of the ith interval.
- i = The value of the spline surface height at the end of the ith interval.
- $X_{i-1}$ = The value of the spline surface sag at the start of the ith interval.
- $X_i$ = The value of the spline surface sag at the end of the ith interval.
- $h_i = \rho_i - \rho_{i-1}$ = The length of the ith interval.
- $M_{i-1}$ = The value of the slope derivative at the start of the ith interval.
- $M_i$ = The value of the slope derivative at the end of the ith interval.
- $\rho$ = The spline surface height (independent variable)
- $S(\rho)$ = The spline surface sag as a function of height (dependent variable); and wherein the value for X at spline intervals 0, 1, 2, etc. is

|  | Surface $R_1$ | Surface $R_3$ |
|---|---|---|
| X(0) | 0.0000000 | 0.0000000 |
| X(1) | 0.2108668 | 0.1795877 |
| X(2) | 0.8554116 | 0.7202623 |
| X(3) | 1.7838662 | 1.4361922 |
| X(4) | 1.9775600 | 1.6027882; | wherein the value for $\rho$ at spline intervals 0, 1, 2, etc. is

| $\rho(0)$ | 0.0000000 | 0.0000000 |
|---|---|---|
| $\rho(1)$ | 1.0780200 | 0.7222734 |
| $\rho(2)$ | 2.1560400 | 1.4444546 |
| $\rho(3)$ | 3.2340801 | 2.1668202 |
| $\rho(4)$ | 3.6360801 | 2.4760010; | and wherein the value for M at spline intervals 0, 1, 2, etc. is

| M(0) | 0.3644990 | 0.6859612 |
|---|---|---|
| M(1) | 0.3596961 | 0.6935749 |
| M(2) | 0.4358774 | 0.6937277 |
| M(3) | −0.6375478 | −1.4543979 |
| M(4) | −2.1376087 | −0.6921574. |

9. A non-linear lens according to claim 6 wherein the second lens grouping comprises a convex-concave first lens element, a double convex second lens element, a double concave third lens element, and a double convex fourth lens element, arranged in that order from the first lens grouping, the first lens element having a thickness $t_5$ along the optical axis and spherical surfaces $R_5$ and $R_6$, the second lens element having a thickness $t_7$ and spherical surfaces $R_7$ and $R_8$, the third lens element having a thickness t9 and spherical surfaces $R_9$ and $R_{10}$, and the fourth lens element having a thickness $t_{10}$ and spherical surfaces $R_{10}$ and $R_{11}$, the surface $R_{10}$ of the third lens element matching the surface $R_{10}$ of the fourth lens element and being substantially in contact therewith, the surfaces $R_6$ and $R_7$ being separated by a distance $t_6$ along the optical axis and the surfaces $R_8$ and $R_9$ being separated by a distance $t_8$ along the optical axis; wherein the radii of curvature for the surfaces are:
$1.091F < R_4 < 1.092F$
$0.2373F < R_5 < 0.2376F$
$0.272F < R_6 < 0.273F$
$0.3936F < R_7 < 0.3940F$
$0.334F < R_8 < 0.335F$
$0.2268F < R_9 < 0.2271F$
$0.280F < R_{10} < 0.285F$
$0.571F < R_{11} < 0.572F$;
wherein the thicknesses of the lens elements along the optical axis are
$0.047F < t_5 < 0.049F$
$0.186F < t_7 < 0.189F$
$0.019F < t_9 < 0.022F$
$0.06F < t_{10} < 0.07F$
$0.08F < t_{12} < 0.09F$;
and wherein the spaces separating the lens elements are:
$0.0004F < t_6 < 0.0014F$
$0.037F < t_8 < 0.041F$ 10. A non-linear lens according to claim 9 wherein the surface $R_4$ in the first lens grouping and the surface $R_5$ in the second lens grouping are separated by a distance $t_4$ which is greater than 3.248F and less than 3.251F.

* * * * *